United States Patent
Kuper et al.

(10) Patent No.: US 7,365,100 B2
(45) Date of Patent: Apr. 29, 2008

(54) COMPOSITIONS OF SUSPENDED NON-AGGREGATED CARBON NANOTUBES, METHODS OF MAKING THE SAME, AND USES THEREOF

(75) Inventors: Cynthia A. Kuper, Philadelphia, PA (US); Mike Kuzma, Philadelphia, PA (US)

(73) Assignee: Nanodynamics, Inc., Buffalo, NY (US)

( * ) Notice: Subject to any disclaimer, the term of this patent is extended or adjusted under 35 U.S.C. 154(b) by 150 days.

(21) Appl. No.: 10/342,257

(22) Filed: Jan. 15, 2003

(65) Prior Publication Data

US 2008/0076837 A1 Mar. 27, 2008

Related U.S. Application Data

(60) Provisional application No. 60/348,275, filed on Jan. 15, 2002.

(51) Int. Cl.
*B01F 17/00* (2006.01)
*B01F 3/12* (2006.01)
*H01B 1/00* (2006.01)

(52) U.S. Cl. .......... 516/32; 516/77; 252/500; 977/742; 977/842

(58) Field of Classification Search .......... 516/32
See application file for complete search history.

(56) References Cited

U.S. PATENT DOCUMENTS

| | | | |
|---|---|---|---|
| 5,853,877 A * | 12/1998 | Shibuta | 428/357 |
| 6,187,823 B1 | 2/2001 | Haddon et al. | |
| 6,582,047 B2 * | 6/2003 | Koitabashi et al. | 347/16 |
| 6,682,677 B2 * | 1/2004 | Lobovsky et al. | 264/172.11 |
| 6,783,746 B1 * | 8/2004 | Zhang et al. | 423/447.1 |
| 6,827,918 B2 * | 12/2004 | Margrave et al. | 423/447.1 |
| 2003/0089893 A1 * | 5/2003 | Niu et al. | 252/500 |

FOREIGN PATENT DOCUMENTS

| | | |
|---|---|---|
| JP | 08-231210 | 9/1996 |
| JP | 2001-048511 | 2/2001 |

OTHER PUBLICATIONS

J-M Bonard et al., "Purification and Size-Selection of Carbon Nanotubes," *Advanced Materials*, vol. 9, No. 10, pp. 827-831, Aug. 8, 1997, XP 000695464.

B. Vigolo et al., "Macroscopic Fibers and Ribbons of Oriented Carbon Nanotubes," *Science*, vol. 290, pp. 1331-1334, Nov. 17, 2000, XP-002341594.

* cited by examiner

*Primary Examiner*—Randy Gulakowski
*Assistant Examiner*—Timothy J. Kugel
(74) *Attorney, Agent, or Firm*—Chinh H. Pham; Greenberg Traurig LLP

(57) ABSTRACT

The invention is directed, in part, to stable compositions of suspended carbon nanotubes, methods of making them, and uses thereof. The invention provides methods of producing high and low concentrations of highly dispersed carbon nanotubes suspended in a liquid. The carbon nanotube suspensions are of use in generating products with improved strength, weight, strength to weight ratio, electrical and thermal versatility, radiation shielding, capacitance, dielectric properties, selective ion flow, catalytic activity and biological applications. The invention provides for industrial processing of materials comprising carbon nanotubes such as, but not limited to, fibers, films, synthetic membranes, coatings, drug delivery systems, and molecular circuitry components.

8 Claims, No Drawings

COMPOSITIONS OF SUSPENDED NON-AGGREGATED CARBON NANOTUBES, METHODS OF MAKING THE SAME, AND USES THEREOF

RELATED APPLICATIONS

This application claims benefit of U.S. provisional application No. 60/348,275, filed on Jan. 15, 2002, which is hereby incorporated by reference herein in its entirety.

1. FIELD OF THE INVENTION

This invention relates to novel compositions of suspended, stable, non-aggregating carbon nanotubes, methods of making such compositions of suspended carbon nanotubes, and the uses of the compositions.

2. BACKGROUND OF THE INVENTION

The verification of the existence of a third form of carbon termed "fullerenes" in 1990 touched off an intense wave of research and development aimed at maximizing the potential of this "new" material. The term "fullerene" is often used to designate a family of carbon molecules, which have a cage-like hollow lattice structure. These "cages" may be different forms, such as spheres ("buckyballs"), or tubes ("nanotubes"). See Robert F. Curl and Richard E. Smalley, Fullerenes, *Scientific American*, pg 54-83, October 1991 (describing the properties and structure of fullerenes).

2.1. Carbon Nanotubes

Carbon nanotubes can exist as closed concentric multi-layered shells or multi-walled nanotubes (MWNTs) or as a single-walled nanotubes (SWNTs). However, the preferred carbon nanotube for industrial application is a single-wall carbon nanotube.

Carbon nanotubes, and in particular single-wall carbon nanotubes, because of their wide-range of electrical properties are used for making electrical connectors in micro devices such as integrated circuits or in semiconductor chips used in computers because of their electrical conductivity and small size. Carbon nanotubes are also used as antennas at optical frequencies, and as probes for scanning probe microscopy such as are used in scanning tunneling microscopes (STM) and atomic force microscopes (AFM).

In addition, because of their mechanical strength, carbon nanotubes are also used as strengthening agents in any composite material in conjunction with carbon black in tires for motor vehicles or in conjunction with graphite fibers in airplane wings and shafts for golf clubs and fishing rods.

Carbon nanotubes may also be used in combination with moldable polymers that can be formed into shapes, sheets or films to make electrically conductive shapes, sheets or films and are also useful as supports for catalysts used in industrial and chemical processes such as hydrogenation, reforming and cracking catalysts. Thus, in view of their broad range of applications, a convenient easily manipulable form of carbon nanotubes would be extremely useful.

Both MWNTs and SWNTs have been produced and the specific capacity of these materials has been evaluated by vapor-transport reactions. For example, modification of the spark erosion technique enabled the preparation of macroscopic quantities of nanotubes, which were then evaluated using vapor-transport reactions and X-ray diffraction. See for example, Zhou et al., *Defects in Carbon Nanotubes, Science*: 263, 1744-47, 1994. However, it is believed that single-walled carbon nanotubes hold the most promise for future nanotube based materials.

2.2. Single Walled Carbon Nanotubes

Since their discovery in 1991, single-walled nanotubes of carbon have been extensively investigated. See Dresselhaus et al., *Science of Fullerenes and Carbon Nanotubes*, Academic Press, (1996) (comprehensive and cumulative review of the state of the art in 1996). Such studies included, inter alia, scanning tunnel spectroscopy studies, transport measurements and magnetoresistance studies. See Dresselhaus et al., *Science of Fullerenes and Carbon Nanotubes*, Academic Press, 756-869 (1996). Based on scanning-tunneling microscopy (STM) images and electron diffraction studies, single-walled nanotubes ("SWNTs") were shown to consist of a seamless cylinder of a graphitic sheet capped by hemispherical ends composed of pentagons and hexagons. See Ge et al., *Appl. Phys. Lett.* 65 (18), 2284-2286 (1994). See also Sattler, *Carbon* 33(7), 915-920 (1995). In this cylindrical shape, the graphite is in either zigzag or arm chair helical configuration. See Ge et al., *Appl. Phys. Lett.* 65 (18), 2284-2286 (1994). Such cylinders had a diameter of about 1 nm. See Ge et al. *Appl. Phys. Lett.* 65 (18), 2284-2286 (1994). Curves observed in high-resolution transmission electron microscope (HRTEM) images of SWNTs indicate that the single-walled tubes are more pliable than their multi-walled counterparts.

Single-walled carbon nanotubes form the basis of materials with exceptional mechanical and electrochemical properties, including polymer reinforcement and molecular electronics. Despite their intrinsic rigidity and high anisotropy, the current available macroscopic forms of SWNTs are isotropic and rather fragile. Vigolo et al., *Macroscopic Fibers and Ribbons of Oriented Carbon Nanotubes, Science*, 290, 17, 1331.

Previous work on carbon nanotubes (both single-walled and multi-walled), has been carried out on intractable forms of this material. Yakobson et al., *Fullerene Nanotubes: $C_{1,000,000}$ and Beyond, American Scientist*, 1997, 85, 324-337. This form of the material is not amenable to many of the processing steps that are necessary if the single-walled carbon nanotubes (SWNTs) are to reach their full potential, particularly in applications that require these materials in the form of polymers, copolymers, composites, ceramics and moldable forms.

Currently, the carbon nanotube raw material is produced in bulk as a fluffy solid. As they form in the gas phase, the carbon nanotubes condense into a solid and naturally aggregate with one another to forms ropes of nanotubes. These ropes further agglomerate to form larger random tangles. This tangled form of the bulk material cannot be used in many of the projected applications. Additionally, the "as made" nanotube material's do not exhibit the conductivity, strength, thermal properties, surface area or electronic nature of the carbon nanotube molecule itself.

While present forms of the SWNTs can be heterogeneously dispersed in various media, in most cases the interactions between the SWNTs and the media and between the SWNTs themselves are simply physical, and without the formation of chemical bonds. Thus, without further manipulation (either chemical or physical) the advantageous properties of the SWNTs are unlikely to be realized on a macroscopic level.

Carbon nanotubes, and more specifically, single-walled carbon nanotubes are completely intractable solids, in that they are not soluble in any liquid and as a result are very difficult to manipulate. In order to make a fiber, film or coating from a solid material either dissolved or suspended in a liquid, a concentration of at least 1% by weight of the material is desirable due to limitations in viscosity and mass transfer ("Fundamentals of Fibre Formation", A. Ziabicki, John Wiley and Sons (1976)). Preferentially, the carbon nanotubes are individually suspended in a liquid at these or comparable concentrations to form a fiber, film or coating.

Solubilization of single-walled carbon nanotubes have been achieved by various techniques including the addition of surfactants or functionalization of the end caps and side-walls of the nanotubes. However, each of these methods has inherent deficiencies, such as low concentration of nanotubes or modification of the intrinsic carbon nanotube's properties. Concentrations of less than 1% by weight of carbon nanotubes have been achieved; for example, Hirsch et al. were able to functionalize single-walled nanotubes with large organic molecules making them soluble in highly polar solvents (tri-chloromethane) at concentrations of 0.5% wt/wt (50 mg/mL). Hirsch et al., J. Am. Chem. Soc, 124, 760-761 (2002). Specifically, Hirsch et al. observed that functionalized single-walled carbon nanotubes were very soluble in $CHCl_3$, $CH_2Cl_2$, acetone, methanol, ethanol and water. Hirsch et al., J. Am. Chem. Soc, 124, 760-761 (2002). Although lesser concentrations may be used for incorporation into some composite systems, most applications and systems preferentially require higher concentrations of suspended material. Ideally, the carbon nanotubes should be preferentially monodispersed (i.e., highly separated) in the suspension for the development of many of the projected applications.

There is a report of nanotubes suspended in a surfactant mixture, where the surfactant was sodium dodecylsulfate (SDS) (see B. Vigolo, et al., Science 290, 1331 (2000)). SDS which has a Critical Micelle Concentration (CMC) of about 8 mM or ten times greater than cetyl trimethyl ammonium bromide (CTAB) The maximum solubility of NT was reported to be about 3 g/L.

Additionally, in many applications, toxic solvents do not lend themselves to industrial processing and can add to cost of production. While chemically attaching molecules to the nanotubes may increase their solubility, it also alters their electronic and mechanical properties and the attached moieties cannot be easily removed once the nanotubes are incorporated into a host system (such as a paint or plastic or even a bulk form of the nanotubes).

Well-dispersed, non-aggregating, highly concentrated, suspended forms of carbon nanotubes and methods of producing the same are necessary to advance the different technologies. Although long believed to be impossible, the present invention teaches such a procedure for the dispersion and suspension of carbon nanotubes, and specifically, single-walled nanotubes. The present invention teaches the use of surfactants to produce highly concentrated compositions of suspended carbon nanotubes (to concentrations of greater than 1 wt %).

3. SUMMARY

The invention is directed, in part, to stable compositions of suspended carbon nanotubes, methods of making them, and uses thereof. The invention provides methods of producing high and low concentrations of carbon nanotubes suspended in a liquid.

The invention provides suspended carbon nanotube compositions comprising a surfactant capable of suspending carbon nanotubes, a liquid, and carbon nanotubes, wherein the liquid, the surfactant and the carbon nanotubes are present in a ratio suitable for the suspension of the carbon nanotubes.

The invention also provides a method of suspending the carbon nanotubes, comprising combining a surfactant capable of suspending carbon nanotubes, a liquid and an amount of carbon nanotubes, wherein the liquid, the surfactant and the carbon nanotubes are present in a ratio suitable for suspending the carbon nanotubes.

The invention also provides suspended carbon nanotube compositions comprising a surfactant capable of suspending carbon nanotubes, a liquid and carbon nanotubes, wherein the liquid and the surfactant and the carbon nanotubes are present in a ratio suitable for the suspension of the carbon nanotubes to a concentration of 3.0 g/L or higher of carbon nanotubes.

The invention provides for the use of the suspended carbon nanotubes in generating products with improved strength, weight, strength to weight ratio, electrical and thermal versatility, radiation shielding, capacitance, dielectric properties, selective ion flow, catalytic activity and biological applications. The invention also provides for industrial processing of materials comprising carbon nanotubes such as, but not limited to, fibers, films, synthetic membranes, coatings, drug delivery systems, and molecular circuitry components.

4. DESCRIPTION OF THE INVENTION

4.1. Definitions

As used herein and unless otherwise indicated the term "liquid" refers to a state of matter intermediate between that of solids or crystalline substances and gases in which a substance has the capacity to flow under extremely small shear stresses and conforms to the shape of the confining vessel, but is relatively incompressible, lacks the capacity to expand without limit, and can possess a free surface. As used herein the term "liquid" is not to be limited to only room temperature liquids but also includes gases that have been condensed to liquids (e.g., liquid $He_2$, $CO_2$, etc.) or solids that have been warmed to their liquid state (e.g., phenol).

As used herein and unless otherwise indicated the term "surfactant" refers to a soluble compound that reduces the surface tension of liquids, or reduces the interfacial tension between two liquids or a liquid and a solid. Examples of surfactants include, but are not limited to, amphoteric surfactants, anionic surfactants, cationic surfactants, or non-ionic surfactants.

As used herein and unless otherwise indicated, the term "counter ion" refers to an ion with a charge opposite to that of another ion included in the ionic makeup of a solution. Examples of negative counter ions include, but are not limited to, fluoride, bromide, chloride, iodide, sulfate, sulfite, nitrate and nitrite. Examples of positive counter ions include, but are not limited to, sodium, calcium, potassium, magnesium, or lithium and also include transition metals of Groups 3-13.

As used herein and unless otherwise indicated, the term "amphoteric surfactant(s)" refers to surfactants having both a positive and a negative charge or having both basic or acidic characteristics. Examples of amphoteric surfactants include, but are not limited to, lauramidopropyl dimethyl betaine, cocoamidopropyl dimethyl betaine, lauryl dimethyl betaine, tallow dihydroxyethyl betaine, cocoimidazoline dicarboxylate, and cocoamidopropyl hydroxysultaine.

As used herein and unless otherwise indicated, the term "anionic surfactant(s)" refers to surfactants having a negative net charge. Anionic surfactants as used herein include, but are not limited to, sulfosuccinate diesters of the formula:

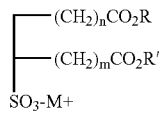

wherein R and R' is independently an alkyl group, M+ is a Group 1 metal, and n and m are independently integers from 0 to 20; sulfosuccinate monoesters of the formula:

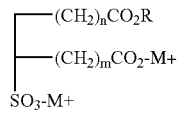

wherein R an alkyl group, M+ is a Group 1 metal, and n and m are independently integers from 0 to 20; naphthalene sulfonate formaldehyde condensates of the formula:

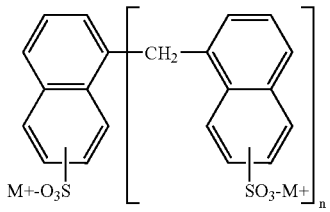

wherein M+ is a Group 1 metal, and n is integers from 1 to about 5000; and benzenesulfonates of the formula:

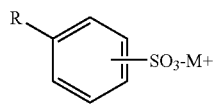

wherein R an alkyl group and M+ is a Group 1 metal.

As used herein and unless otherwise indicated, the term "cationic surfactant" refers to surfactants having a positive net charge. Cationic surfactants as used herein include, but are not limited to, alkyl dimethy benzyl ammonium compounds of formula:

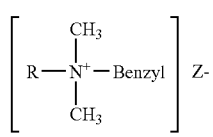

wherein R is an alkyl group and Z— is a counter ion; alkyl trimethyl ammonium compounds of formula:

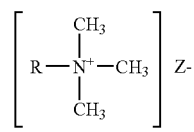

wherein R is an alkyl group and Z— is a counter ion; dialkyl dimethyl ammonium compounds of formula:

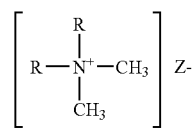

wherein R is an alkyl group and Z— is a counter ion; and trialkyl methyl ammonium compounds of formula:

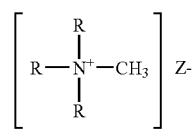

wherein R is an alkyl group and Z— is a counter ion.

As used herein and unless otherwise indicated, the term "nonionic surfactant" refers to surfactants having no net charge. Nonionic surfactants as used herein include, but are not limited to, sorbitan fatty acid esters of the formula:

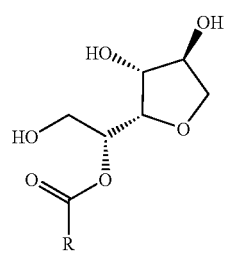

wherein R is an alkyl group; polyoxyethylene sorbitan monolaurate; polyoxyethylene sorbitan monostearate; polyoxyethylene sorbitan monooleate; polyethylene glycol fatty acid ester of the formula:

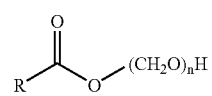

wherein R is an alkyl group and n is an integer from 0 to 20; alkanol amides of the formula:

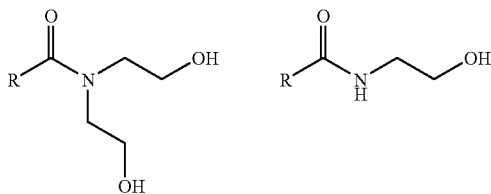

wherein R is an alkyl group; dimethyl amine oxides of the formula:

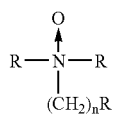

wherein R is an alkyl group and n is an integer from 0 to 20; amine ethoxylates of formula:

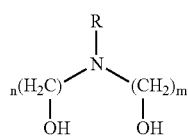

wherein R is an alkyl group and n and m are independently integers from 0 to 20; phosphate diesters of the formula:

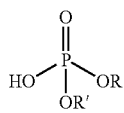

wherein R and R' are independently alkyl groups; phosphate monoesters of the formula:

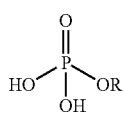

wherein R is an alkyl group.

As used herein and unless otherwise indicated, the term "alkyl ammonium surfactant" refers to a compound of formula:

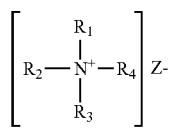

wherein $R_1$, $R_2$, $R_3$, and $R_4$ are independently an alkyl group and Z— is a counter ion. Examples of preferred alkyl ammonium surfactants include, but are not limited to, trimethylammonium surfactants, such as for example cetyl trimethyl ammonium fluoride, cetyl trimethyl ammonium chloride, cetyl trimethyl ammonium bromide, and cetyl trimethyl ammonium iodide.

As used herein and unless otherwise indicated, the terms "alkyl" and "alkyl group" include saturated monovalent linear, branched, and cyclic hydrocarbon radicals. An alkyl group can include one or more double or triple bonds. It is understood that cyclic alkyl groups comprise at least three carbon atoms.

As used herein and unless otherwise indicated, the term "lower alkyl" means branched or linear alkyl having from 1 to 6, more preferably from 1 to 4 carbon atoms. Examples include, but are not limited to, methyl, ethyl, propyl, isopropyl, isobutyl, and tertiary butyl.

As used herein and unless otherwise indicated, the term "aryl" includes an organic radical derived from an aromatic hydrocarbon by removal of one hydrogen, such as phenyl or naphthyl.

As used herein and unless otherwise indicated, the term "aralkyl" means an aryl substituted with one or linear, branched, or cyclic alkyl groups. Aralkyl moieties can be attached to other moieties through their aryl or alkyl components.

As used herein and unless otherwise indicated, the terms "heterocyclic group" and "heterocycle" include aromatic and non-aromatic heterocyclic groups containing one or more heteroatoms each selected from O, S and N. Non-aromatic heterocyclic groups include groups having only 3 atoms in their ring system, but aromatic heterocyclic groups (i.e., heteroaryl groups) must have at least 5 atoms in their ring system. Heterocyclic groups include benzo-fused ring systems and ring systems substituted with one or more oxo moieties. An example of a 4 membered heterocyclic group is azetidinyl (derived from azetidine). An example of a 5 membered heterocyclic group is thiazolyl, and an example of a 10 membered heterocyclic group is quinolinyl. Examples of non-aromatic heterocyclic groups include, but are not limited to, pyrrolidinyl, tetrahydrofuranyl, tetrahydrothienyl, tetrahydropyranyl, tetrahydrothiopyranyl, piperidino, morpholino, thiomorpholino, thioxanyl, piperazinyl, azetidinyl, oxetanyl, thietanyl, homopiperidinyl, oxepanyl, thiepanyl, oxazepinyl, diazepinyl, thiazepinyl, 1,2,3,6-tetrahydropyridinyl, 2-pyrrolinyl, 3-pyrrolinyl, indolinyl, 2H-pyranyl, 4H-pyranyl, dioxanyl, 1,3-dioxolanyl, pyrazolinyl, dithianyl, dithiolanyl, dihydropyranyl, dihydrothienyl, dihydrofuranyl, pyrazolidinyl, imidazolinyl, imidazolidinyl, 3-azabicyclo[3.1.0]hexanyl, 3-azabicyclo[4.1.0]heptanyl, 3H-indolyl, quinolizinyl, and substituted derivative thereof. Examples of aromatic heterocyclic groups include, but are not limited to, pyridinyl, methylpyridine analgoues, imidazolyl, pyrimidinyl, pyrazolyl, triazolyl, pyrazinyl, tetrazolyl, furyl, thienyl, isoxazolyl, thiazolyl, oxazolyl, isothiazolyl, pyrrolyl, quinolinyl, isoquinolinyl, indolyl, benzimidazolyl, benzoimidazoles, benzofuranyl, cinnolinyl, indazolyl, indolinyl, indolizinyl, phthalazinyl, pyridazinyl, triazinyl, isoindolyl, pteridinyl, purinyl, oxadiazolyl, thiadiazolyl, furazanyl, benzofurazanyl, benzothiophenyl, benzothiazolyl, benzoxazolyl, quinazolinyl, quinoxalinyl, naphthyridinyl, furopyridinyl, and substituted derivatives thereof. The foregoing groups, as derived from the compounds listed above, may be C-attached or N-attached where such attachment is possible. For instance, a group derived from pyrrole can be pyrrol-1-yl (N-attached) or pyrrol-3-yl (C-attached).

As used herein and unless otherwise indicated, the term "heteroaryl" means an aromatic heterocycle.

As used herein and unless otherwise indicated, the term "substituted" as used to describe a compound or chemical moiety means that at least one hydrogen atom of that compound or chemical moiety is replaced with a second chemical moiety. Examples of second chemical moieties include, but are not limited to: halogen atoms (e.g., chlorine, bromine, and iodine); $C_1$-$C_6$ linear, branched, or cyclic alkyl (e.g., methyl, ethyl, butyl, tert-butyl, and cyclobutyl); hydroxyl; thiols; carboxylic acids; esters, amides, silanes, nitriles, thioethers, stannanes, and primary, secondary, and tertiary amines (e.g., —$NH_2$, —$NH(CH_3)$, —$N(CH_3)_2$, and cyclic amines). Preferred second chemical moieties are chlorine, hydroxyl, methoxy, amine, thiol, and carboxylic acid.

As used herein and unless otherwise indicated, the term "aqueous liquid" refers to a mixture of water and a second material wherein the second material is completely ionized. Examples of aqueous liquids include, but are not limited to, sodium fluoride, sodium chloride, sodium bromide, sodium iodide, calcium fluoride, calcium chloride, calcium iodide, calcium bromide, sodium sulfate, sodium sulfite, magnesium fluoride, magnesium chloride, magnesium bromide, magnesium iodide, aqueous ammonium fluoride, aqueous ammonium bromide, aqueous ammonium chloride, and aqueous ammonium iodide.

As used herein and unless otherwise indicated, the term "organic liquid" refers to compounds containing an aryl or alkyl group that are liquids at room temperature or can be brought to liquid form by heating or cooling. Organic liquid also includes liquid organic compounds with the power to dissolve solids, liquids, or gases. Examples of an organic liquid include, but are not limited to, an ether (e.g., diethyl ether or tetrahydrofuran), a hydrocarbon (e.g., hexanes or pentanes), a cyclic hydrocarbon, a cyclic aromatic (e.g., toluene, benzene, xylenes) or an alcohol.

As used herein and unless otherwise indicated, the term "alcohol" refers to any saturated monovalent linear, branched, and cyclic hydroxylated hydrocarbons of the formula R—OH, wherein R is an alkyl group. An alcohol can include one or more double or triple bonds. It is understood that cyclic alcohol comprise at least three carbon atoms. Examples of alcohols include, but are not limited to, methanol, ethanol, propanol, isopropanol, butanol, sec-butanol, tert-butanol, pentanol, and hexanol.

As used herein and unless otherwise indicated, the term "inorganic liquid" is encompassed by aqueous liquids and also includes concentrated acids and bases.

As used herein the term "bundle" refers to two or more individual nanotubes substantially aligned along a common longitudinal axis (i.e., along their length). A nanotube bundle can act as an independent solute. A cross-sectional view of a representative bundle comprising three nanotubes is shown below, wherein each of the circles represents the cross sectional view of an individual nanotube:

The term "rope" as used herein, unless otherwise indicated, refers to an arrangement comprising at least two bundles of nanotubes that are aligned substantially parallel to each other, or in a head to tail configuration, or some combination thereof. A rope can further comprise one or more individual nanotubes. A representation of a nanotube rope is illustrated below, wherein the lines represent bundles of nanotubes or individual nanotubes:

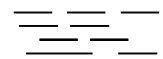

As used herein and unless otherwise indicated, the term "flocculant" refers to a random arrangement of two or more individual nanotubes, nanotube bundles, nanotube ropes, or some combination thereof. A flocculant can result from electrostatically or thermodynamically induced interactions between bundles of nanotubes. A representation of a flocculant is shown below, wherein each of the wavy-lines can be an individual nanotube, a nanotube bundle or a nanotube rope:

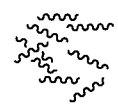

As used herein and unless otherwise indicated, the term "suspended carbon nanotubes" refers to compositions comprising single-walled or multi-walled carbon nanotubes and a surfactant present in a liquid. In specific embodiments, the suspended carbon nanotubes are highly dispersed.

It should be noted that if there is a discrepancy between a depicted structure and a name given that structure, the depicted structure is to be accorded more weight. In addition, if the stereochemistry of a structure or a portion of a structure is not indicated with, for example, bold or dashed lines, the structure or portion of the structure is to be interpreted as encompassing all stereoisomers of it.

All patents cited in the specification are hereby incorporated by reference in their entirety. In the case of inconsistencies, the present disclosure, including definitions and terminology, will prevail.

4.2. DETAILED DESCRIPTION OF THE PREFERRED EMBODIMENTS

The present invention provides novel compositions of suspended, stable, highly-dispersed, non-aggregating carbon nanotubes, also referred to herein as suspended carbon nanotubes to high concentrations. In specific embodiments, the suspended carbon nanotubes are single-walled carbon nanotubes suspended in a liquid with surfactant present in a ratio suitable for the suspension of the single-walled carbon nanotubes. The invention also provides methods for making the stable, non-aggregating carbon nanotubes compositions, and uses of such compositions in various applications, such as industrial applications.

In a specific embodiment, the invention is directed to compositions of single-walled carbon nanotubes, wherein the nanotubes are suspended in a liquid that is, for example, an aqueous liquid, an organic liquid, or an inorganic liquid, with a surfactant that is preferably, a cationic surfactant or an anionic surfactant in a ratio suitable for the suspension of the single-walled carbon nanotubes.

Also encompassed by this invention are methods of preparing suspended carbon nanotubes at varying temperatures, which comprises combining a surfactant capable of suspending carbon nanotubes with an appropriate liquid and the carbon nanotubes under conditions and in a ratio suitable for the formation of a non-aggregating, stable suspension of the carbon nanotubes.

In a specific embodiment, the invention is also directed to methods of preparing suspended single-walled carbon nanotubes at varying temperatures, which comprises combining a surfactant capable of suspending single-walled carbon nanotubes with an appropriate liquid and the carbon nanotubes under conditions and in a ratio suitable for the formation of a non-aggregating, stable suspension of the carbon nanotubes, wherein the single-walled carbon nanotubes are suspended in a liquid that is, for example, an aqueous liquid, an organic liquid, or an inorganic liquid, and the surfactant is preferably, a cationic surfactant or an anionic surfactant.

In yet another embodiment, the invention encompasses methods of using the suspended, stable, non-aggregating carbon nanotubes. Examples of such uses include, but are not limited to, dispersal into plastics and polymers; formation of fibers, films and coatings; inks; processing of molecular circuitry; applications for subcellular manipulation, and drug delivery systems; and applications for textiles.

4.2.1. Compositions Comprising Carbon Nanotubes

The invention provides compositions of suspended carbon nanotubes, which are stable, non-aggregating carbon nanotubes. In the formation of the suspended carbon nanotubes, the nanotube bundles, ropes or flocculants are dispersed into individual nanotube or small nanotube bundles (i.e., bundles comprising about 5 nanotubes or less). In specific embodiments, the suspended carbon nanotubes are highly dispersed and comprise only minimal amounts of small nanotube bundles. The compositions are stable against the reformation of any of the nanotube ropes, larger nanotube bundles or nanotube flocculants. The suspended carbon nanotube composition comprises a liquid, a surfactant and preferentially monodispersed carbon nanotubes. The composition can also comprise an amount of dispersed small nanotube bundles (i.e., bundles comprising two to four nanotubes). Without being limited by theory it is believed that in the presence of the liquid and the surfactant, the interactions between the carbon nanotubes comprising the nanotube bundles, ropes or flocculants are significantly reduced, which results in the stable, non-aggregating suspended carbon nanotubes of the present invention. The compositions comprise a surfactant capable of suspending carbon nanotubes, and a liquid in a proportion suitable for the formulation of the suspended carbon nanotubes.

In different embodiments, the liquid is an aqueous liquid, an alcohol, an organic liquid, an inorganic liquid, or some mixture thereof. The choice of liquid may be motivated by factors such as cost, environmental concerns, safety concerns, and/or the projected application for the suspended nanotubes. In some applications, liquids such as sulphuric acid (e.g., as a solvent for KEVLAR® (poly-paraphenylene terephthalamide)), toluene, n,n-dimethylforamide, n-methylpyrrolidone and other known to one of ordinary skill are desirable. They may, however provide for safety, storage or disposal, as they may be toxic and/or carcinogenic. If an environmentally friendly solvent is preferred, a water-based solvent liquid may be chosen. This can also be the case if the intended application is, e.g., a biological system or some chemical systems. The liquid chosen for suspending the carbon nanotubes also affects the choice of surfactant used in the composition.

In different embodiments, the surfactant is a cationic surfactant, an anionic surfactant, a non-ionic surfactant, an amphoteric surfactant or some combination thereof. In a specific embodiment, the surfactant is an alkyl ammonium surfactant. In another embodiment, the surfactant is a commercially available nonionic polyethylene (PEO) surfactant. Examples of commercially available nonionic PEO surfactants include the TRITON®-X series (alkylaryl polyether alcohols) such as TX-114 or TX-100, the TERGITOL® series of alkyl-PEO alcohols (both available from Union Carbide, Danbury, Conn.), the IGEPAL® series of alkyl phenol ethoxylates (Rhoida, Cranbury, N.J.), and PLURONIC® series of ethylene oxides (BASF, Wyandotte, Mich.). A list of commercially available surfactants is available on the internet (see http://www.bio-rad.com/AIGSoftware/pdfs/3235C1.pdf). In yet other embodiments, the surfactant is a long chain alkyl amine containing, e.g., 6-25 carbon atoms.

The carbon nanotubes are single-walled nanotubes, multi-walled carbon nanotubes, or some combination thereof. In preferred embodiments, the carbon nanotubes are single-walled carbon nanotubes. The carbon nanotubes can be in the form of nanotube bundles, flocculants, or ropes when they are not in the presence of the liquid and the surfactant.

The individual carbon nanotubes comprising the nanotube bundles, ropes and/or flocculants can be single-walled carbon nanotubes, multi-walled carbon nanotubes or some combination thereof. The individual carbon nanotubes can have diameters of about 0.7 nanometer (nm) (e.g., for a single-walled (5,5) carbon nanotube), about 1.4 nm (e.g., for a single-walled (10,10) carbon nanotube), about 3 nm, about 5 nm, about 10 nm, about 30 nm, about 60 nm or about 100 nm, or larger. Individual carbon nanotubes can range in length from about 50 nm to about 1 micron ($\mu$m), about 5 $\mu$m, about 1 millimeter (mm), about 1 centimeter (cm), about 3 cm, or up to about 5 cm, or greater. It is noted that, while the smallest carbon nanotube reported to date is the (5,5) single-walled carbon nanotube (about 0.7 nm in diameter), the present invention provides methods for exploiting nanotubes with any cross-sectional diameter for formulating the suspended carbon nanotube compositions.

The cross-sectional diameter of a nanotube bundle can range from about 1.4 nm, about 5 nm, about 10 nm, about 60 nm, about 100 nm, about 1 $\mu$m or larger. The cross-sectional diameter of a nanotube rope can range from about 3 nm, about 10 nm, about 60 nm, about 100 nm, about 1 $\mu$m, about 10 $\mu$m or larger. The nanotube bundles, ropes and/or flocculants can be purified or unpurified. The nanotubes comprising a bundle, flocculent, or rope can have diameters that are preferentially within a narrow diameter distribution, or they can have widely differing diameters.

In a specific embodiment, one or more of the carbon nanotubes comprising the nanotube bundles, ropes and/or flocculants further comprises one or more nanoscale materials. In different embodiments, the nanoscale material is present within the carbon nanotube cavity or within the interstitial spaces between the carbon nanotubes in the nanotube bundles, ropes and/or flocculants. Examples of nanoscale materials include, but are not limited to, nanoparticles, such as gold, silver and other metal nanoparticle or composite nanoparticles of the metals; quantum dots (QD), including CdSe—ZnS, CdS, ZnS, CdSe, InP, InGaAs, CuCl, and InAs quantum dots, silicon nanocrystals and nanopyramids, silver nanoparticles; or magnetic quantum dots, e.g., nanomagnets, such as CoCu, FeCu, NiFe/Ag, and CoAg nanomagnets. The nanoscale materials can comprise one or more materials, or combinations of materials, such as transition metals, including iron, gold, silver, zinc, cadmium, platinum, palladium, cobalt, mercury, nickel or yttrium; alkali or alkaline earth metals, including sodium, potassium, calcium or cesium; Group III elements, including, aluminum, gallium or indium; Group IV elements, including, silicon, germanium, tin or lead; Group V elements, including, phosphorous, arsenic, antimony, or bismuth; or Group VI elements, including, sulfur, selenium or tellurium. The nanoscale materials can comprise any of the listed materials and in any given combination. Examples of III-V compounds include GaAs or AlGaAs. The nanoscale material can also be a fullerene, or a dielectric, polymeric, or semiconducting nanoparticle. In a related embodiment, the suspended carbon nanotubes further comprise one or more nanoscale materials.

In different embodiments of the composition, the liquid is present in a proportion from about 70% to about 99.99% by volume, and the surfactant is present in a proportion from about 30% to about 0.01% by volume. The amount of nanotube in the composition ranges from about 0.001 g to about 50 g for different embodiments. For a given choice of liquid and surfactant, the ratio suitable for suspending an amount of carbon nanotubes can be determined and/or optimized without undue experimentation by one of ordinary skill. The choice of proportions of liquid, surfactant and nanotubes in the composition could be motivated by factors such as cost, environmental concerns, safety concerns, the purity of the carbon nanotube bundles, ropes or flocculants, the projected application for the suspended nanotubes, operating temperature for the surfactant or the liquid (e.g., if the system is liquid at other than room temperature), different concentrations, viscosity differences between the liquid and the surfactant, the critical micelle concentration (CMC) of the surfactant, and/or liquid crystalline phase transition range. The maximum solubility of nanotubes is also dependent on the choice of liquid, and surfactant type and proportion. The present invention provides concentrations of suspended carbon nanotubes of about 1 wt % or lower, about 1.1 wt %, about 2.0 wt %, about 3.0 wt % or higher. The present invention provides compositions of suspended carbon nanotubes with concentrations of about 3 g/L, about 3.5 g/L, about 5 g/L, about 7 g/L, about 12 g/L or higher.

In a specific embodiment, the liquid is present in an amount of from about 80% to about 96.8% by volume and the surfactant is present in an amount of from about 20% to about 3.2% by volume of the liquid/surfactant mixture. An amount of from about 0.01 g to about 50 g of carbon nanotubes is present with the liquid and the surfactant in the suspended carbon nanotube compositions.

In another embodiment, the liquid is present in an amount from about 99.99% to about 90.00% by volume; the surfactant is present in an amount from about 0.01% to about 10.00% by volume; and the carbon nanotubes are present in an amount of from about 0.001 g to about 50.0 g.

The choice of type of liquid or surfactant and their proportion in the composition can also affect the stability of the suspended carbon nanotubes. The composition can be optimized for chemical stability, temperature stability, and/or stability over time (i.e., the suspended carbon nanotubes do not reform nanotube ropes, flocculants or larger nanotube bundles). In a preferred embodiment, the composition is optimized for stability over desired periods of time, e.g., one hour, two hours, two days, a week, two weeks, two months, or even longer, without significant settling of the suspended nanotubes. In the case of settling, the compositions can be agitated to recover an even dispersion of the suspended carbon nanotubes.

Variations in the Compositions

There are many variations on compositions of liquid and surfactant for the formulation of the compositions of suspended carbon nanotubes. In each composition, the liquid and the surfactant are present in a ratio suitable for the suspension of the carbon nanotubes.

In different embodiments of the composition, the liquid comprises an aqueous liquid, a liquid alcohol, an organic liquid, an inorganic liquid, or some combination thereof. In some embodiments, the combination of liquids is miscible (such as, e.g., water and an alcohol). Other embodiments of the invention may require a combination of immiscible liquids.

In different embodiments of the composition, the surfactant comprises an anionic, a cationic, an amphoteric, a nonionic surfactant, or some combination thereof. In a specific embodiment, the surfactant comprises an alkyl ammonium surfactant, more particularly, a cetyl trimethyl ammonium surfactant such as cetyl trimethyl ammonium fluoride, cetyl trimethyl ammonium chloride, cetyl trimethyl ammonium bromide, or cetyl trimethyl ammonium iodide. In a preferred embodiment, the composition comprises cetyl trimethyl ammonium bromide (CTAB).

4.2.2. Methods of Making Suspended Carbon Nanotubes

The invention also provides methods of preparing suspended carbon nanotubes. The method comprises combining a surfactant capable of suspending carbon nanotubes, with a liquid, and the carbon nanotube bundles, ropes or flocculants under conditions (e.g., at varying temperatures) and in a ratio suitable for the formation of a non-aggregating, stable suspension of the carbon nanotubes.

In different embodiments, the carbon nanotubes are single-walled or multi-walled carbon nanotubes. In a specific embodiment, the carbon nanotubes are single-walled carbon nanotubes. In other embodiments, the single walled carbon nanotubes are in the form of bundles, flocculants, or ropes.

In an alternate embodiment, the invention is directed to methods of preparing suspended single-walled carbon nanotubes at varying temperatures, which comprises combining a liquid with a surfactant capable of suspending single-walled carbon nanotubes and the carbon nanotubes under conditions and in a ratio suitable for the formation of a non-aggregating, stable suspension of the carbon nanotubes. Preferably, the single-walled carbon nanotubes are suspended in a liquid that is, for example, an aqueous liquid, an organic liquid, or an inorganic liquid, and the surfactant is preferably, a cationic surfactant or an anionic surfactant.

The conditions under which the suspended carbon nanotubes are prepared will be determine in part by the choice of liquid and surfactant. Different surfactants and polymer surfactants might require different temperatures and concentrations to due to viscosity differences and differences of their CMC and/or liquid crystalline phase transition range. In some embodiments, the composition can be prepared at room temperature, or it may be necessary to heat or cool the mixture. In specific embodiments, the composition is prepared at temperatures of about 20° C. to about 30° C., or lower, or at about 50° C., or about 70° C. or higher. In yet other embodiments, it may be necessary to stir or sonicate the mixture for a period of time during the preparing the suspended carbon nanotubes, e.g., for about 30 seconds, about one minute, about two minutes, or longer. For example, when using poly (sodium 4-styrene sulfonate), it may be necessary to use an ice bath during sonication. For cases including carboxy methyl cellulose it may be necessary to heat the suspension, e.g., to an elevated temperature of around 70° C., while stirring the mixture.

In some embodiments, the composition is prepared in a single step by combining the liquid, surfactant and nanotube bundles, ropes or flocculants at the same time. In other embodiments, the nanotube bundles, ropes or flocculants are introduced after the surfactant and liquid have been combined. The nanotubes can be introduced into the various systems as a dry mass or in a carrier liquid (e.g. deionized water present after synthesis or purification of the nanotubes). In a specific embodiment, the nanotube carrier liquid also serves as the liquid in which the nanotubes are suspended when the optimal proportion surfactant is added in a suitable ratio.

The choice of procedure and preparation conditions for combining the liquid, surfactant and nanotubes will depend on such choices as desired proportions and types of liquid, surfactant and nanotubes, cost, environmental concerns, safety concerns, the purity of the carbon nanotube bundles, ropes or flocculants, the projected application for the suspended nanotubes, desired temperature for the surfactant or the liquid (e.g., if the system is liquid at other the room temperature), different concentrations, viscosity differences between the liquid and the surfactant, the CMC of the surfactant, and/or liquid crystalline phase transition range. The steps of heating or cooling can be performed a single time or multiple times and for varying temperatures during the preparation of a suspended nanotube composition. Stirring or sonication can also be performed a single time or multiple times and for varying lengths of time during the preparation of a composition.

4.2.3. Uses of Suspended Carbon Nanotubes

The highly-dispersed, non-aggregating, highly concentrated, suspended forms of carbon nanotubes of the present invention find many applications in present day technologies. The suspended carbon nanotubes can be incorporated or added at any stage in the process or formation of the different host systems or applications. The suspended carbon nanotubes can be incorporated with the starting materials or added at any stage in the formation of the application. The suspended carbon nanotubes can be incorporated into a bulk material, or remain on a surface of the material. While the carbon nanotubes of the compositions are coated with surfactant molecules, which enables them to disperse in liquids such as water, the surfactant molecules can be removed if desired after the suspended nanotubes are processed into the different host systems. For example, if the carbon nanotube suspensions are to be used to, e.g., self assemble on a substrate for molecular circuits, the presence of organic moieties is a great hindrance. Therefore, a further step in using the suspended carbon nanotubes could be to remove the surfactant molecules during the flow process that lays them on the substrate, or after the nanotubes are on the surface. For application in plastics, of interest to the automotive industry, nanotubes may be dispersed in composites to give them static charge so they retain paint. A well dispersed nanotube/composite would mean more charge per unit area using less material, which could help mitigate the high costs of the material in the near term. Additionally, single-walled carbon nanotubes could also reinforce coatings for endurance and protection against corrosion. There are any number of different applications of the present invention of suspended carbon nanotubes.

In a first embodiment, the suspended carbon nanotube compositions are used as an industrial agent for processing fibers, films, coatings, inks or textiles. Carbon nanotubes, because of their diminutive dimensions having a structure related to the structure of $C_{60}$ exist, have the potential to be used in similar ways to carbon fibers. In particular, the structure of carbon nanotubes makes their aspect ratio (length/diameter, L/D) comparable to that of long fibers. In a typical embodiment, the aspect ratio of carbon nanotubes is less than 10,000. Thus, the aspect ratio of carbon nanotubes is generally much greater than that of conventional short fibers, such as short glass fibers and short carbon fibers. In addition, the nanotubes can potentially be lighter than conventional carbon fibers, while being stronger and stiffer than the best conventional carbon fibers. These materials are over 100 times stronger than steel and weigh about ⅙ as much. The suspended carbon nanotubes can be incorporated with the starting materials or added at any stage in the formation of the fibers, films, coatings, inks or textiles.

In another embodiment, the carbon nanotubes in the suspended carbon nanotube compositions are used for the enhancement of strength to weight, electronic and thermal properties including, but not limited to radiation shielding, enhanced capacitance and dielectric properties. Depending on their diameter, helicity (i.e., arrangement of carbon atoms in the walls of the nanotube), and number of layers (single-walled v. multi-walled) carbon nanotubes have electronic properties between those of conductors and semi-conductors. They may thus be added to an electrically insulating material to increase its conductivity. In addition, carbon nanotubes have great mechanical strength, being cited as having bending modulus values of from about 1000 to about 5000 GPa. Moreover they can be used as highly efficient, fracture micromechanisms, which would prevent pure brittle failure with a concomitant low strain.

Tangling can give rise to a reduction in the homogeneity of fiber blends since it is difficult for the fibers to distribute themselves evenly within the surrounding matrix. This reduces the mechanical strength of the blends, since lack of homogeneity introduces weak points in a blend at positions where, for instance, there is a relatively low concentration of fiber and a high concentration of polymer. Moreover the randomizing of the orientation of the fibers also reduces the mechanical strength of the blends. This is because (for example) the maximum resistance to strain in a given direction will be achieved when all of the fibers in the blend are oriented with their longitudinal axes aligned in that direction. The further that a blend deviates from such an ideal orientation, the less the resistance to strain of the blend in that direction. In this regard the invention also encompasses a use sufficient to improve mechanical properties by controlling the orientation of the nanotubes.

In another embodiment, the suspended carbon nanotube compositions are used in any part of the process and or design of fabricating fuel cell components. Fuel cells include but are not limited to solid oxide fuel cells and polymer electrolyte membrane (PEM) fuels cells (also known as proton exchange membrane fuels cells). This embodiment includes but is not limited to using suspended carbon nanotubes in the production of PEM type fuels whether the end product is the form of a component or additive in the membrane. Purposes may include but are not limited to inhibiting fouling and cracking of the membrane. This also includes but is not limited to using suspended carbon nanotubes resulting in an additive in the fuel cell membrane to increase storage of the fuel and increase ion transport and ion selectivity. Ions can include, but are not limited to, hydrogen in the form $H^+$, $OH^-$, and $CH_3^+$.

In another embodiment, the suspended carbon nanotube compositions are used in the process of fabricating storage devices, e.g., charge storage devices (supercapacitors) or electrochemical and gas phase hydrogen-storage. The carbon nanotubes have an aspect ratio of the order of 1000, making them ideal for high strength materials in the form of fibers and lend enormous surface area for gas storage applications.

In another embodiment, the suspended carbon nanotube compositions are used in the process of fabricating batteries. Batteries can include but are not limited to lithium ion batteries and lithium batteries. In this embodiment the carbon nanotubes are used for purposes including, but not limited to, increasing energy storage capacity, improving recycling ability, capacitance, strength to weight.

In another embodiment, the suspended carbon nanotube compositions are used as an industrial reagent in molecular electronics and composite systems. An industrial reagent is defined as a material used either alone or in combination with other reagents, which through some process is used to produce a material, device or system. Nanotube composite materials and systems include, but are not limited to, paints, coating, plastics and biological compounds. The nanotube composite materials and systems have applications in, e.g., fuel components, cells, reinforcements, paneling in automotive, aerospace industry, sporting goods, and goods industries.

There is extensive interest into nanoelectronics and molecular electronics. Single-walled nanotubes come in two forms, metallic or semi-conducting. This makes the materials ideal for a variety of different electronic applications such as building molecular circuits, switches, and reinforcements in conducting films, insulating films and semi-conducting films. The suspended carbon nanotubes can be used for forming transistors through, e.g., self-assembly and/or flow fabrication of suspended carbon nanotubes onto a surface. In a specific embodiment, the suspended carbon nanotubes and/or the surface are functionalized for greater control of self-assembly. The suspended carbon nanotubes can also be used in producing memory storage devices, e.g., if a nanomagnet or nanoparticle dopant (as described above) is also present. The self-assembly of suspended carbon nanotubes can also be exploited for creating field emission displays, e.g., by providing nanotubes to act as field emitters.

In another embodiment, the suspended carbon nanotube compositions are used to produce membrane structures. A membrane structure is defined as any structure having pores in either a geometrically organized or random structure. Purpose of the membrane include but are not limited to biological application for synthetic skins, shunts, coatings and valves.

In an another embodiment, the suspended carbon nanotube compositions are used in the production of sensors and actuators. Examples of sensors include, but are not limited to, single molecule sensors or sensor devices.

Examples of additional, non-limiting applications of the suspended carbon nanotubes include optoelectronic and all-optical switches, lenses, probes, lasers, nanoelectromechanical systems (NEMS), circuitry and nanoelectronics, nanomachines (e.g., by attaching nanomotors), neural networks (nanoelectrodes for connections), nanocomputers, quantum computers, high-density magnetic memory or storage media, photonic crystals, nanocrystal antennas, multi-nanowell assay plates, nanocatalysts (e.g., palladium), nanopores for single-molecule DNA sequencing (if small length nanotubes are used), amplifiers for telecommunications (approximately 7 nm PbSe and PbS quantum dots have a tunable gap near 1500 nm). Applications include, for example, memory or storage devices (e.g., hard-disk drive read heads, magnetic RAM), magnetic field sensors, magnetic logic devices, logic gates, and switches.

5. EXAMPLES

Example 5.1

Suspension of Carbon Nanotubes

A given amount of purified carbon nanotubes in distilled water, which appeared as black undispersed clumps, was dried in a vacuum oven. The surfactant used was cetyltrimethylammonium bromide (CTAB). In aqueous solutions, the critical micelle concentration (CMC) for CTAB is 0.9 mM. For temperatures above the Krafft point, the temperature below which micelles are insoluble, i.e., where the monomer solubility is too small for micelle formation, and concentrations less than the CMC the surfactant exists on the average as unassociated molecules in the solution (J. L. Moilliet and B. Collie, Surface Activity (D. Van Nostrand Co., NY 1951); see also G. J. T. Tiddy, Physics Reports 57, No. 1, 3 (1980)). Below the Krafft point (about 22 Celsius for CTAB) most of the surfactant crystallized out of the suspension and settled to the bottom of the container. Above the Krafft point and above the CMC, the CTAB first formed spherical micelles which then evolved to rod-like micelles with increasing concentration of CTAB.

The dried nanotube clumps were added to stock solutions of CTAB/water of varying wt % CTAB in selected amounts and sonicated. Almost immediately the black nanotube clumps fell apart and formed an opaque solution with the CTAB/water stock solution. When viewed under a microscope in thin section, the opaque solution appeared as a uniform gray background with a few undissolved clumps of nanotube material of varying sizes (0.5 to 2 micrometer). For example, suspensions of around 5 to 6 grams per liter of nanotubes were obtained in a 2 wt % CTAB solution, which is about three times the CMC for CTAB. AFM characterization of this solution indicated the dissolved nanotube/CTAB complexes were within reasonable size limits.

Example 5.2

Stability of Suspended Carbon Nanotubes

Under long term storage of the suspended carbon nanotubes of Example 5.1 for a period of a few weeks some of the suspended nanotubes settled out. This was possibly due to the samples being stored at a temperature slightly below the Krafft point of CTAB. (The average temperature in the lab was 19-22° C.) The settled material had the appearance of black clumps of a spongy consistency. Another possible mechanism of coagulation is depletion flocculation (see, e.g., A. G. Yodh, et al., Phil. Trans. R. Soc. Lond. A 359, 921-937 (2001) (describing the mechanism of depletion flocculation)). The remaining solution remained opaque. The values quoted in Example 5.1 (5-6 g/L) pertain to these aged samples.

Clear residual surfactant adsorbed onto the nanotube's surfaces stabilizes the remaining suspension. Studies of surfactants adsorbed to graphite surfaces show cationic surfactants are adsorbed as parallel straight stripes of half cylindrical micellar aggregates (S. Manne et al., Science 270, 1480 (1995); see, e.g., A. J. Groszek, Proc. Roy. Soc. London Ser., A314, 473 (1970) for a detailed discussion of alkane chain adsorption onto graphite surfaces). The curvature of the nanotube modified this picture to some extent since the CTAB length was a little less than twice the radius of the single-walled nanotube (14 Å or 1.4 nm). A proposed mechanism is that the nanotubes are decorated by half blobs of surfactant which act as bumpers, increasing the average distance between the NT and reducing the Van-der-Waals attraction below the thermal energy.

Example 5.3

Preparation of Suspended Carbon Nanotubes

Single-walled carbon nanotubes, purified by standard methods, were weighed in the amount of 0.1453 g. Boiled deionized water (DI water) measured in the amount of 10.005 g was mixed with the SWNTS. An amount of 0.1994 g of CTAB was added to this mixture. The mixture was sonicated in a sonicating bath for 2 minutes, then allowed to rest overnight at 25° C. The mixture was then sonicated for an hour. The concentration was measured by taking a known aliquot of the suspension and drying it in a pre-weighed petri in a vacuum oven. After drying is complete the mass of the perti dish plus the aliquot of suspension is measured. The concentration of CTAB is known and the mass of the petri is known, so from this one may calculate the mass of the SWNTs left after drying. For the experiment described above the concentration of SWNTs in water with surfactant was measured at 12 g/L.

It is preferable that the concentration of surfactant be at least 10-100 times above the CMC for CTAB (CMC CATB=0.9×10$^{-3}$M or 0.328 g/L) for it to be effective at suspending nanotubes. It is also preferable that the temperature remain above 22° C., as it is the Kraft point for CTAB, which is defined as the temperature below which the micelles of the surfactant are not soluble in the liquid.

The samples were characterized by optical clarity and AFM of a spin coated sample on mica. One such sample was mixed with polystyrene sulfonate and the AFM of a thin film of this mixture showed nanotubes imbedded in the polymer as single tubes and small bundles of bundles of tubes. A small bundle is one having a diameter no greater than 5 nm. This procedure is optimized for CTAB. Other surfactants and polymer surfactants may require different temperatures and concentrations to due to viscosity differences between them and the choice of liquid and the differences of their CMC and/or liquid crystalline phase transition range.

Example 5.4

Various Concentration of Suspended Carbon Nanotubes

In one example a suspension was made using 0.1975 g of CTAB, 10.086 g of boiled deionized water and 0.0378 g of purified SWNT (from the HiPco process: a gas-phase method for large-scale production of single-walled carbon nanotubes) to yield a suspension with concentration 3.8 g/L of SWNTs in water with CTAB.

In another example a suspension was made using 0.1977 g of CTAB, 10.0196 g of boiled DI water and 0.0777 g of purified SWNTs (from HiPco) to yield a final concentration of SWNTs in water with CTAB of 7.8 g/L.

In yet another experiment a suspension was made using 0.1994 g of CTAB in 10.005 g of boiled DI water and 0.1453 g of purified SWNTs (from HiPco). The measured concentration of dispersed tubes in this suspension was found to be 12 g/L SWNTs in water with surfactant.

The SWNTs used in the preparation of these suspensions were derived from the HiPco process, purchased from CNI, Inc. (Houston, Tex.). All of the suspensions were sonicated for about an hour to achieve dispersion. AFM of these suspensions were performed on samples spin coated onto a mica substrate and revealed the presence of individual tubes and small bundles of tubes (3-5 tubes) coated with surfactant. The surfactant was removed from the suspension with the additional of methanol, which caused flocculation of the tubes.

6. MISCELLANEOUS

All references cited herein are incorporated herein by reference in their entirety and for all purposes to the same extent as if each individual publication, patent or patent application was specifically and individually indicated to be incorporated by reference in its entirety for all purposes.

Many modifications and variations of the present invention can be made without departing from its spirit and scope, as will be apparent to those skilled in the art. The specific embodiments described herein are offered by way of example only, and the invention is to be limited only by the terms of the appended claims along with the full scope of equivalents to which such claims are entitled.

What is claimed is:

1. A method of suspending carbon nanotubes comprising:
   combining an alkyl ammonium surfactant capable of suspending carbon nanotubes,
   a liquid; and
   an amount of carbon nanotubes,
   wherein the surfactant, the liquid, and the carbon nanotubes are combined at a temperature of from about 0° C. to about 175° C.; and
   wherein the liquid, the surfactant and the carbon nanotubes are present in a ratio suitable for suspending the carbon nanotubes as non-aggregated nanotubes.

2. The method of claim 1, wherein the carbon nanotubes are single-walled or multi-walled carbon nanotubes.

3. The method of claim 2, wherein the carbon nanotubes are single-walled carbon nanotubes.

4. The method of claim 1, wherein the carbon nanotubes are in the form of bundles, flocculants, or ropes before being combined with the liquid and the surfactant.

5. The method of claim 1, wherein the liquid is present in an amount of from about 99.97% to about 90.00% by volume of the liquid/surfactant mixture; the surfactant is present in an amount of from about 0.01% to about 10% by volume of the liquid/surfactant mixture; and the carbon nanotubes are present in an amount of from about 0.01 g to about 50 g.

6. The method of claim 1, wherein the temperature is between 0° C. and 20° C.

7. The method of claim 1, wherein the suspended carbon nanotubes are formed at room temperature.

8. The method of claim 1, further comprising sonicating the suspended carbon nanotubes.

* * * * *